(12) United States Patent
Wang et al.

(10) Patent No.: US 7,477,424 B2
(45) Date of Patent: Jan. 13, 2009

(54) APPARATUS HAVING A LIGHT SOURCE FOR A TRANSPARENT SHEET OF A SCANNER

(75) Inventors: Hsing-Tung Wang, Tai-Chung (TW); Bing-Zhi Wang, Hu-Wey (TW)

(73) Assignee: Transpacific Optics LLC, Wilmington, DE (US)

( * ) Notice: Subject to any disclaimer, the term of this patent is extended or adjusted under 35 U.S.C. 154(b) by 878 days.

(21) Appl. No.: 10/015,569

(22) Filed: Dec. 17, 2001

(65) Prior Publication Data

US 2003/0112481 A1    Jun. 19, 2003

(51) Int. Cl.
*H04N 1/04* (2006.01)
*H04N 1/46* (2006.01)

(52) U.S. Cl. .................. 358/474; 358/475; 358/487; 358/509

(58) Field of Classification Search ......... 358/471–475, 358/509, 487; 362/310, 297; 250/491.1
See application file for complete search history.

(56) References Cited

U.S. PATENT DOCUMENTS

| | | | | |
|---|---|---|---|---|
| 5,535,021 A | * | 7/1996 | Chiang et al. | 358/474 |
| 5,712,694 A | * | 1/1998 | Taira et al. | 349/9 |
| 5,798,649 A | * | 8/1998 | Smayling et al. | 324/551 |
| 5,798,849 A | * | 8/1998 | Tsai | 358/475 |
| 6,046,826 A | * | 4/2000 | Lu et al. | 358/475 |
| 6,194,732 B1 | * | 2/2001 | Okino | 250/491.1 |
| 6,266,163 B1 | * | 7/2001 | Hirakawa | 358/475 |
| 6,505,946 B2 | * | 1/2003 | Suzuki et al. | 362/610 |
| 6,827,457 B2 | * | 12/2004 | Umemoto et al. | 362/601 |
| 6,864,998 B2 | * | 3/2005 | Kito et al. | 358/471 |
| 7,031,028 B2 | * | 4/2006 | Liu et al. | 358/406 |
| 2002/0089840 A1 | * | 7/2002 | Kawakami et al. | 362/31 |
| 2003/0011898 A1 | * | 1/2003 | Mai et al. | 359/808 |

FOREIGN PATENT DOCUMENTS

JP    10197969 A  *  7/1998

* cited by examiner

*Primary Examiner*—Houshang Safaipour
(74) *Attorney, Agent, or Firm*—Perkins Coie LLP

(57) ABSTRACT

The present invention relates to an apparatus having a light source for a transparent sheet of a scanner that includes a lamp, a reflective plate, a spreading plate and a protective plate. The light rays emitted by the lamp are used to scan a transparent sheet, the reflective plate in the arc shape reflects the light rays onto the scanning platform and there is an aperture on the predetermined position of the reflective plate to decrease the illumination for distributing uniformly the light rays. Besides, the spreading plate has a plurality of perforations to advance the light rays distributed uniformly. The protective plate made of the material pervious to light protects the components of this invention. As those described above, there are many advantages for the present invention, such as the structure is simple, the cost is low, and is much practical and can highly improve the performance of a scanner for a transparent sheet.

24 Claims, 7 Drawing Sheets

APPARATUS HAVING A LIGHT SOURCE FOR A TRANSPARENT SHEET OF A SCANNER

BACKGOUND OF THE INVEINTION

1. Field of the Invention

The invention relates to an apparatus having a light source for a transparent sheet, especially to an apparatus having a light source for a transparent sheet of a scanner with lower cost and highly uniform illumination.

2. Description of the Prior Art

The technology of obtaining the digital data by a scanner to scan the paper is highly developed and the scanner scans the transparent sheet such as transparency, negative, and slides by appropriate light source ("Transparency Adaptor, TA" ) to provide additional light rays. The structure of "Transparency Adaptor" describes as follow:

Refer to FIGS 1A & 1B, a conventional scanner 1 comprises a lower shell object 10 and an upper shell object 11, the lower shell object 10 usually has an image adaptor module 12, a transmission motor 14 and a transmission axle 15; image adaptor module 12 has a lamp 120, a reflective plate 121, a lens 122 and an image sensor device 123; the scanner 1 scans the reflective sheet and obtains a digital data by only using the aforementioned components, the detailed steps are not mentioned here. If the user wants to scan the transparent sheet, a "Transparency Adaptor" 13 should be installed into the upper shell object 11. It is clearly shown in FIG 1B, the "Transparency Adaptor" 13 has a lamp 130, a transmission motor 131 and a transmission axle 132. When the transparent sheet 2 is placed on the scanning plafform 101, the light rays produced by the lamp 130 pass through the transparent sheet 2 and the images of the transparent sheet pass through the reflective plate 121, the lens 122 and are formed in the imagine image sensor device 123. Then the image sensor device 123 converts the images into the digital data for output. Then the transmission motor 14 drives the imagine adopter image adaptor module 12 to move along the direction of the transmission axle 15 (as the arrow shown in FIG IB), in the meantime, the lamp 130 of the "Transparency Adaptor" 13 is driven synchronally by the transmission motor 131 and moved forward along the direction of the transmission axle 132. By the actions aforementioned, each portion of the transparent sheet has been exposed and converts digital data for output.

The other conventional Transparency Adaptor is as shown in FIGS 2A & 2B. Most components of the scanner I as shown in the FIGS 2A & 2B are as-the same as those of the scanner 1 as shown in the FIGS 1A & 1B, the difference is that the transparency adaptor 16 of the upper shell object 11 comprises a lamp 160 and a light-conducting plate 161. The light-conducting plate 161 is used to distribute uniformly the light rays produced by the lamp 160, so the transparency adaptor 16 provides the light rays for the transparent sheet 2 without driven by a transmission motor. We obtain easily the digital data output by the image sensor device 123, when the transmission motor 14 drives the imagine image adaptor module 12 to move along the direction of the transmission axle 15.

The first kind of the conventional Transparency Adaptor aforementioned uses a lamp illuminating the reflective sheet directly, the light rays for the imagine image sensor device 123 is stronger and the digital data output is better, but it needs a lot of components and complex structures, such as the transmission motor and the transmission axle, which increase the difficulty and the cost of combining the scanner. Oppositely, the second kind of the Transparency Adaptor which can decrease the difficulty and the cost of combining the scanner, but the light rays passing through the light-conducting plate is not efficiently and uniformly, the quality of the digital image output from the imagine-image sensor device cannot be improved.

SUMMARY OF THE INVENTION

It is therefore the object of the present invention to improve the quality of the digital image output from the image sensor device by obtaining highly uniform light rays for a transparent sheet of a scanner.

It is the other object of the present invention is to provide an apparatus having a light source for a transparent sheet of a scanner with low cost and easily combining.

Base on the aforementioned idea, the present invention provides an apparatus having a light source for a transparent sheet of a scanner that comprises a shell object, a light-emitting element inside the shell object for emitting light, a reflective plate which is between the shell object and the light-emitting element to reflect the light emitted by the light-emitting element, and an aperture on the first predetermined position of the reflective plate for decreasing the illumination of the first predetermined position.

Base on the idea aforementioned, wherein the light-emitting element is a lamp or a LED array.

Base on the idea described above, wherein the reflective plate is in the arc or "Π" shape.

Base on the idea aforementioned, wherein an aperture's central part is wider than its two ends.

Base on the idea described above, wherein the apparatus having the light source for a transparent sheet of a scanner further comprises a spreading plate which is a thin film between the light-emitting element and the reflective plate to cover the light-emitting element for spreading the light rays passing through it.

Base on the idea aforementioned, wherein the spreading plate has a plurality of perforations for decreasing illumination of the second predetermined position by increasing the perforations of the second predetermined position.

Base on the idea described above, wherein the apparatus having the light source for a transparent sheet of a scanner further comprises a protective plate made of the material pervious to light, which is at the surface of the shell object to protect the light source for a transparent sheet of a scanner.

Base on the idea aforementioned, wherein the first and second predetermined positions are at the central part of the light-emitted element.

BRIEF DESCRIPTION OF THE DRAWING

The foregoing and other aspects of the invention will become more apparent upon a description of the best mode for carrying out the invention, as rendered below. In the description to follow, reference will be made to the accompanying drawing, in which.

DETAILED DESCRIPTION OF PREFERRED EMBODIMENT

Figure 1A:
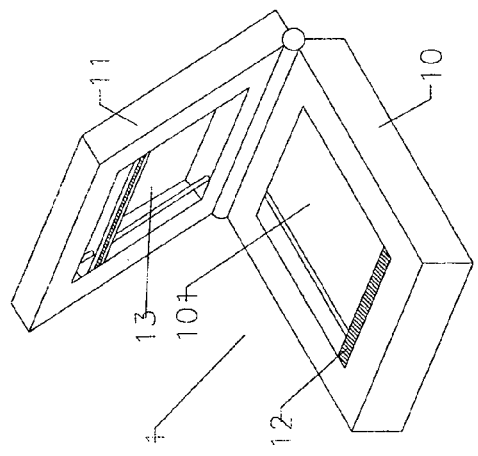
FIG. 1A is a schematic view of the conventional scanner with the first kind of the Transparency Adaptor.
Figure 1B:
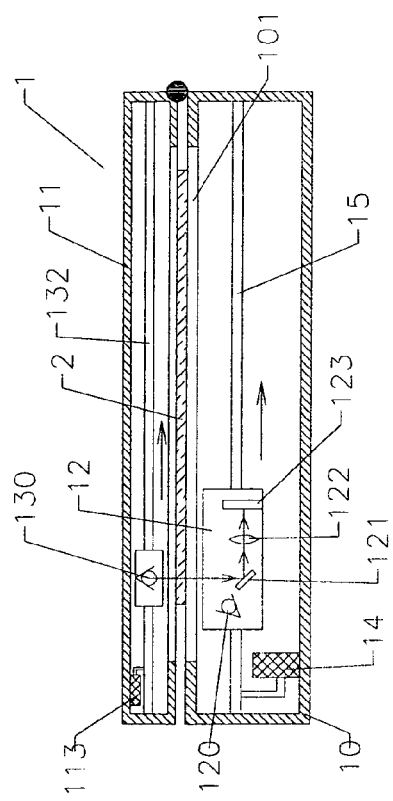
FIG. 1B is a sectional schematic view of the conventional scanner with the first kind of the Transparency Adaptor.
Figure 2A:
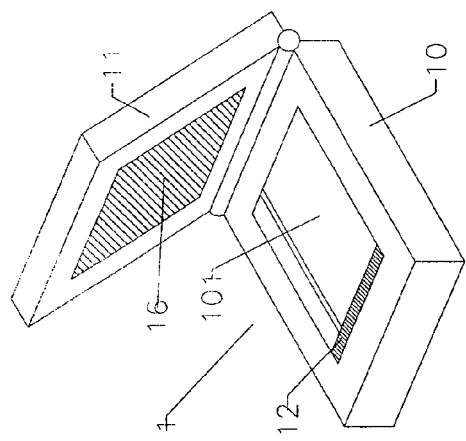
FIG. 2A is a schematic view of the conventional scanner with the second kind of the Transparency Adaptor.
Figure 2B:
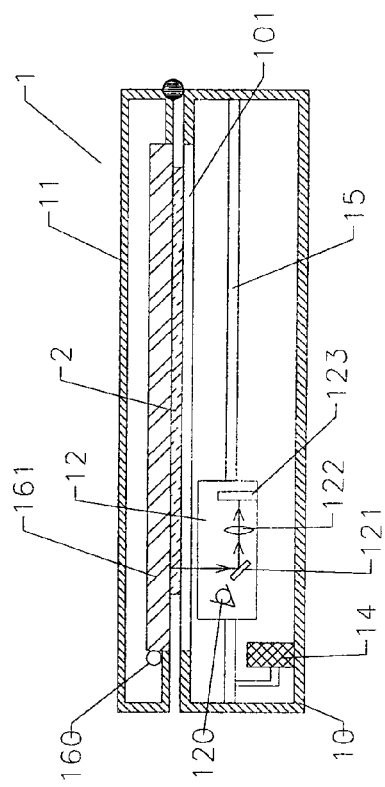
FIG. 2B is sectional schematic view of the conventional scanner with the second kind of the Transparency Adaptor.
Figure 3:
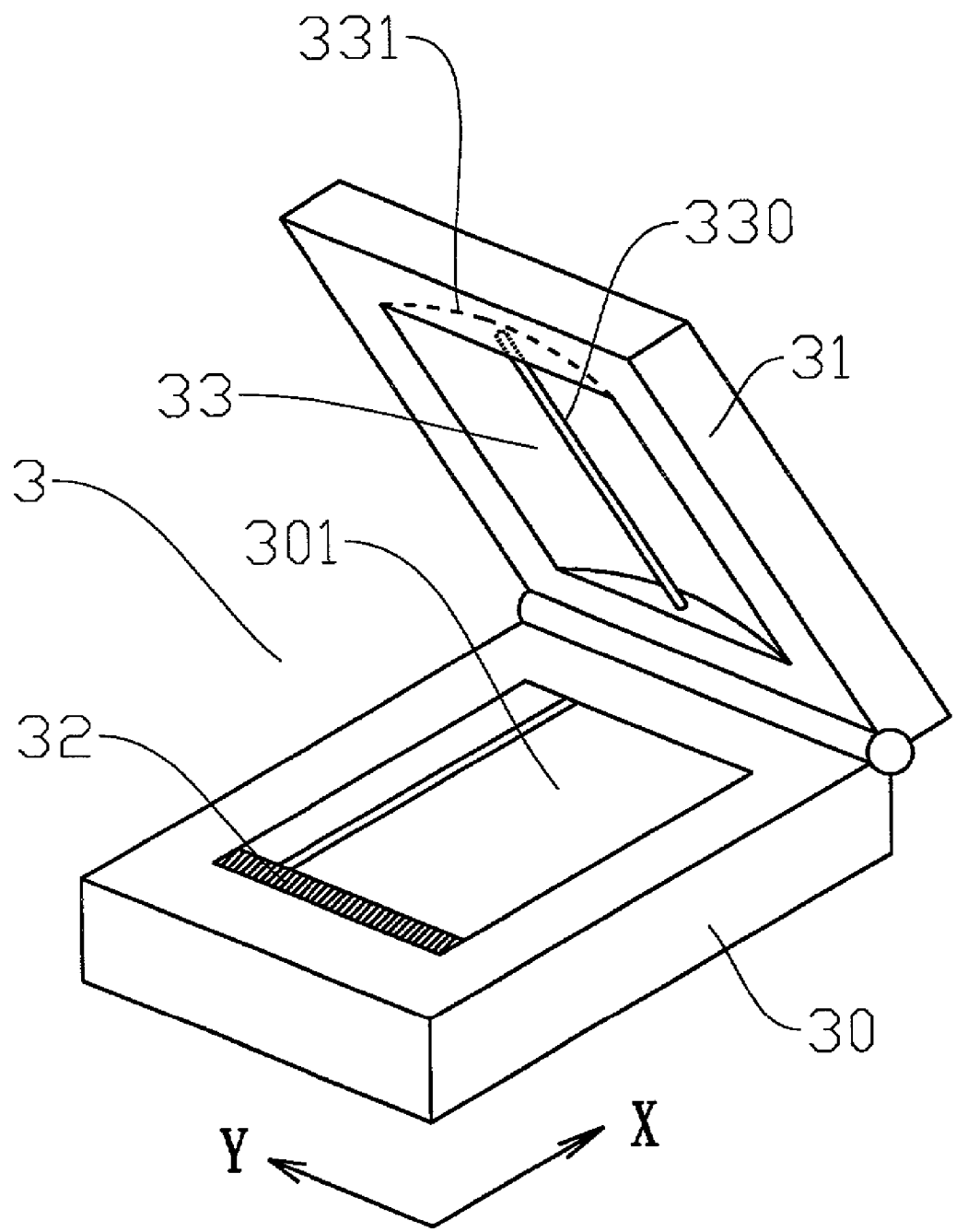
FIG. 3 is a schematic view of the scanner with the light source for a transparent sheet of a scanner of the present invention.
Figure 4A:
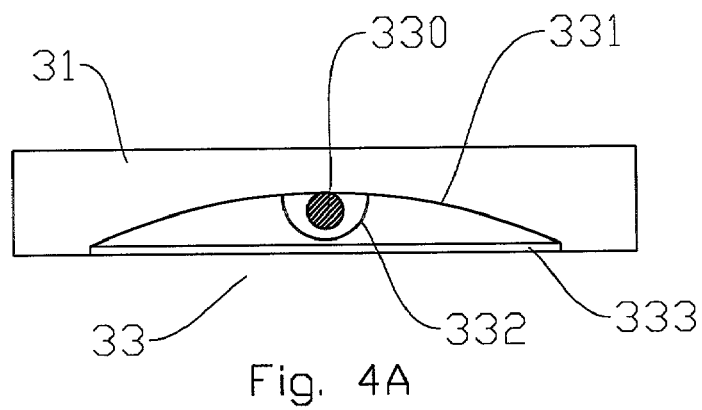
FIG. 4A is a sectional schematic view of the apparatus having the light source for a transparent sheet of a scanner of the present invention.
Figure 4B:
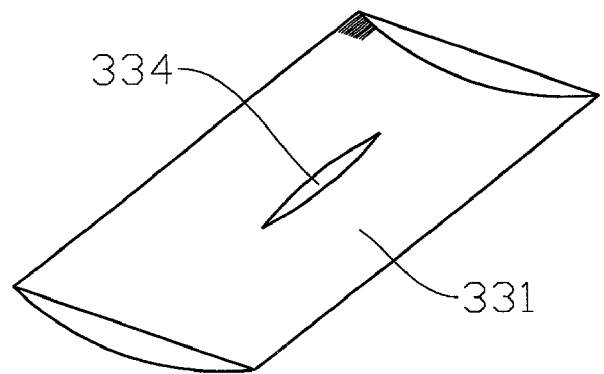
FIG. 4B is a schematic view of the reflective plate of the apparatus having the light source of this invention.

First of all, refer to the FIG 3, which is the schematic view of the scanner with a light source for a transparent sheet of a scanner of this present invention. As shown in this FIG, the scanner 3 composes the lower shell object 30 and the upper shell object 31, the components of the lower shell object 30 (such as the image adaptor 32) are the same as those of the conventional scanner; but for the reason of improving the images quality of the transparent sheet of the present invention, the transparency adaptor 33 within the upper shell object 31 uses a lamp 330 to emit the light rays and the reflective plate 331 to focus and reflect the light rays onto the scanning platform 301 for scanning the transparent sheet. Below is the further detailed description of the transparency adaptor of the present invention:

The preferred embodiment of the transparency adaptor 33 of the present invention is as shown in the FIG. 4A. In which, the apparatus having the light source for a transparent sheet of a scanner 33 of the present invention has a lamp 330, a reflective plate 331, a spreading plate 332 and a protective plate 333 and all of them are inside the upper shell object 31; the lamp 330 as the light source emits the light rays for scanning the transparent sheet because the lamp 330 has the advantages of adequate brightness and lower cost, which is the appropriate light source for the present invention. Besides, a reflective plate 331 is put behind the lamp 330 and between the upper shell object 31 and the lamp 330. The sectional schematic view of the reflective plate 331 is in the arc shape as shown in FIG. 4A and FIG. 4B, which can reflect the light rays from the lamp 330 concentrating onto the scanning platform 301. For the brightness of the central part is brighter than the two ends of the lamp as the dotted line in the brightness distribution figure shown in FIG. 4C, therefore, an aperture 334, its central part is wider than the two ends, is on the reflective plate 331 as shown in FIG. 4B, the aperture 334 leaks some light rays of the lamp 330 and prevent them from reflecting onto the scanning platform 301, which balances the brightness of the central part and the two ends of the lamp 330, as the line in the brightness distribution figure shown in FIG. 4C, the balanced brightness for scanning the transparent sheet (not shown) is helpful to improve the quality of the digital data.

Figure 6:
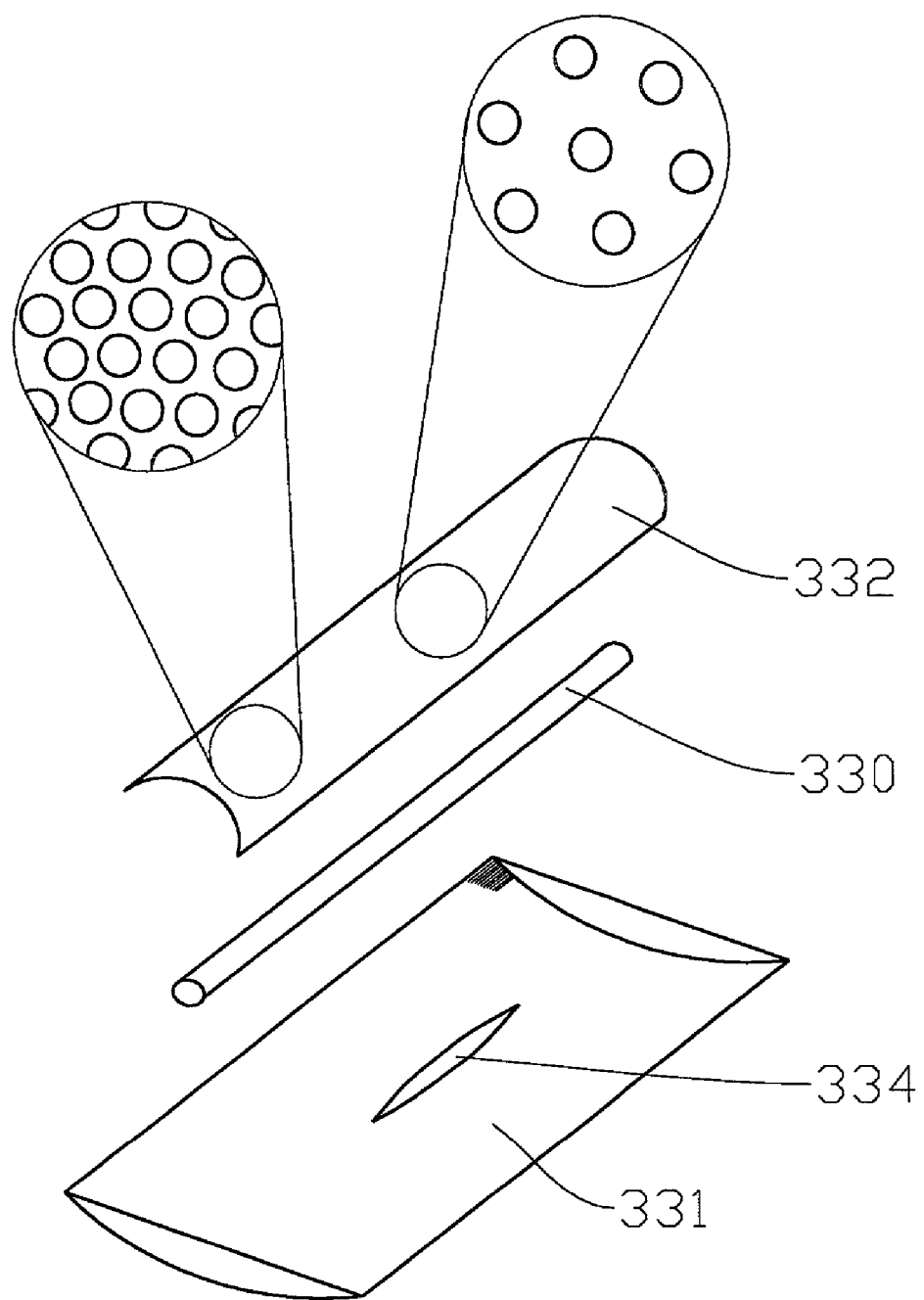
FIG. 6 is a schematic view of the spreading plate of the apparatus having the light source for a transparent sheet of a scanner of the present invention.

Furthermore, the spreading plate 332 of the apparatus having the light source for a transparent sheet of a scanner 33 is a thin film with the function to spread uniformly the light passing through it. As shown in FIG 6 (an isometric exploded bottom view), it-the spreading plate 332 is proximate to the lamp 330 and the reflective plate 331 and covers the lamp 330. The surface of the spreading plate 332 has several perforations for balancing the brightness of the light rays emitted by the lamp 330, the present invention decreases the perforations of the spreading plate 332 relatively to the brighter position of the lamp 330 (such as the central part of the lamp 330) to decrease the illumination, so the brightness of the light rays wherein will be lowered. It is opposite that increasing the perforations of the spreading plate 332 relatively to the darker location of the lamp 330 (such as the two ends of the lamp 330) raises illumination, so the brightness of the light rays will be increased. By the actions described above, which can balance the light rays for the scanning platform, the quality of the digital output from the present invention will be improved as well.

In addition, the apparatus having the light source for a transparent sheet of a scanner 33 of the present invention has a protective plate 333, which is the material made of pervious to light (such as glass), is on the surface of the upper shell object 31 to protect the components of the apparatus having the light source for a transparent sheet of a scanner 33.

Figure 4C:
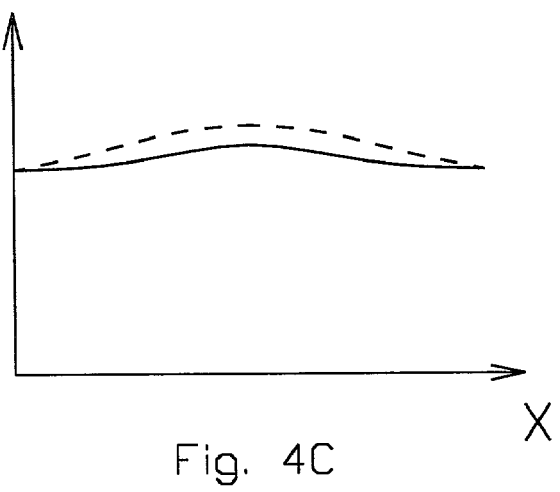
FIG. 4C is a distributed figure of the brightness of the light rays produced by the apparatus having the light source for a transparent sheet of a scanner of the present invention.
Figure 5A:
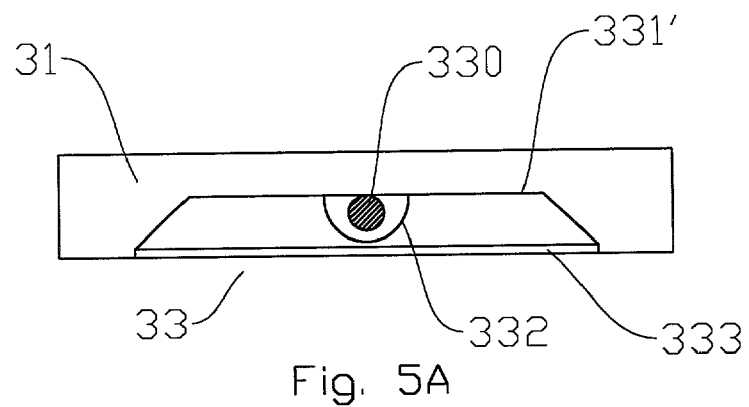
FIG. 5A is a sectional schematic view of the other preferred embodiment of the apparatus having the light source for a transparent sheet of a scanner of the present invention.
Figure 5B:
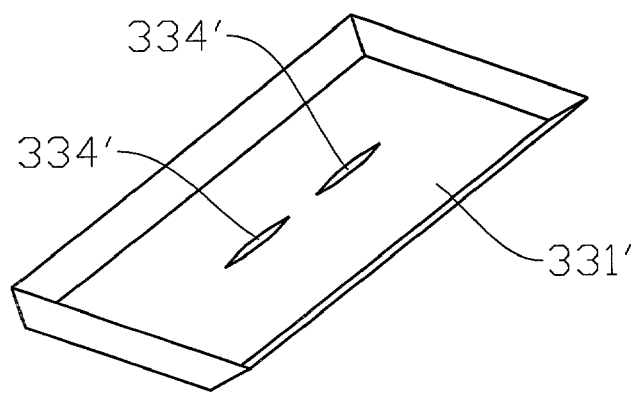
FIG. 5B is a schematic view of the reflective plate in the other preferred embodiment of the apparatus having the light source for a transparent sheet of a scanner of the present invention.
Figure 5C:
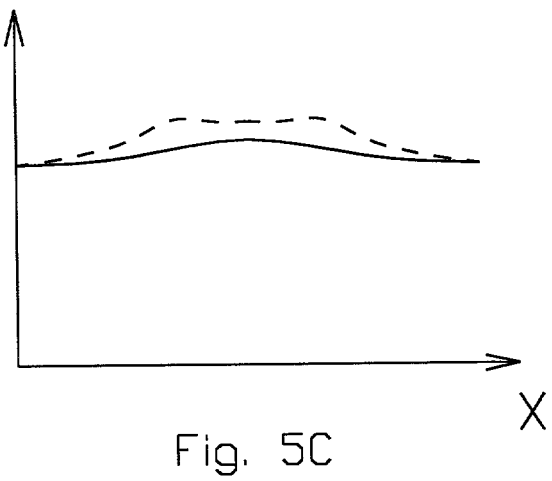
FIG. 5C is distributed figure of the brightness of the light rays produced by the apparatus having the light source for a transparent sheet of a scanner of the other preferred embodiment to the present invention.

The other preferred embodiment of the apparatus having the light source for a transparent sheet of a scanner 33 of the present invention is as shown in FIG. 5A, wherein the most parts of the apparatus having the light source for a transparent sheet of a scanner 33 of the present invention are as same as those described above, but the sectional schematic view of the reflective plate 331' is in the "Π" shape as shown in FIGS. 5A and 5B, which can reflect the light rays from the lamp concentrating onto the scanning platform 301, and the reflective plate 331' of this preferred embodiment is easier to compose; but the brightness of the lamp 330 passing through the reflective plate 331' will be distributed as the dotted line shown in FIG. 4C, therefore, the present invention places two apertures 334' on the reflective plate 331', these apertures' 334' central parts are also wider than the two ends as shown in FIG. 5B, which can decrease the brightness of the central part of the lamp 330 and balance the distribution of the brightness as the line shown in FIG. 5C, it is helpful to improve the quality of the digital data output by the balanced distributing brightness of light rays for scanning the transparent sheet.

Figure 7:
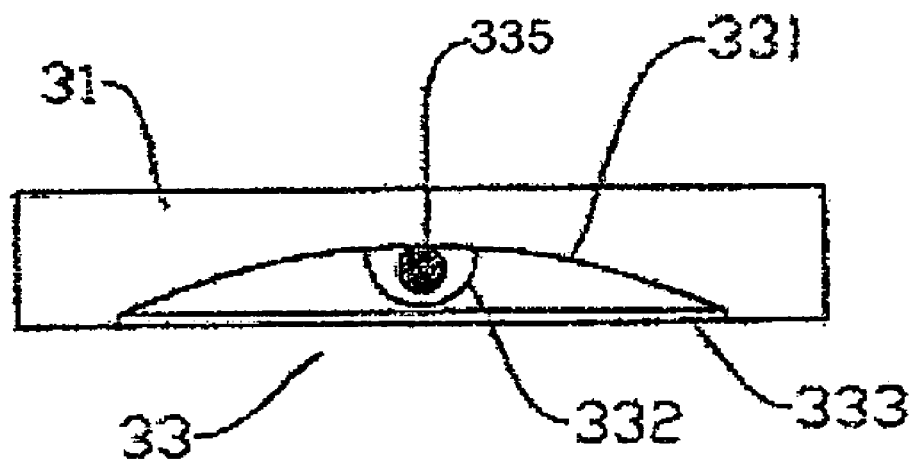
FIG 7 is a sectional schematic view of one embodiment of the claimed subject matter.

In one embodiment, the lamp 330 of the present invention as described above may comprise a LED array, which can meet the purpose of the present invention. For example. referring now to FIG. 7. there is illustrated vet another preferred embodiment of The claimed subject matter. In this et another referred embodiment scanner 33 includes a li ht source 335 which a comprise a light emitting element such as a li ht emitting diode LED array, for example. Scanner 33 may comprise additional components such as an upper shell object 31 a reflective plate 331. a spreading plate 332 and a protective plate 333. for example. These components may be the same or similar as components described previously. for example.

As those described above, the present invention uses a lamp as the light source, a reflective plate to reflect the light rays onto the scanning platform, the aperture to improve the light rays uniformly, in the meantime, it uses the spreading plate to finely adjust the distribution of the light rays uniformly. There are many advantages for the present invention that the components are simple, the cost is low, and it is more practical and can highly improve the performance of a scanner to scan the transparent sheet.

Aforementioned are the preferred embodiments of the present invention, these preferred embodiments are used to explained but limit the claim of the present invention. The scope of the present invention is defined by the claims described as follow. The variations and/or modifications according to the claims of the present invention should be contained by the present invention.

What is claimed is:

1. An apparatus, comprising:
   a scanner upper portion having an upper surface;
   a light-emitting element proximate to the upper surface;
   a reflective plate disposed between said upper surface and said light-emitting element, said reflective plate being configured to reflect light emitted from said light-emitting element onto a first surface;
   an aperture formed at a first predetermined position on said reflective plate to decrease said reflected light on a portion of said first surface; and a spreading plate positioned between the light-emitting element and the first surface, wherein the spreading plate includes a first group of perforations that are less densely distributed than a second group of perforations.

2. The apparatus of claim 1 wherein the light-emitting element includes a lamp.

3. The apparatus of claim 1 wherein the reflective plate has a generally arced shape.

4. The apparatus of claim 1 wherein the reflective plate includes a "π"shape.

5. The apparatus of claim 1 wherein the aperture includes a central portion and first and second end portions extending from the central portion, wherein the central portion is wider than the first and second end portions.

6. The apparatus of claim 1 wherein the aperture includes a generally elongated shape.

7. The apparatus of claim 1 wherein the first group of perforations is located at an end portion of the spreading plate and the second group of perforations is located at a central portion of the spreading plate.

8. The apparatus of claim 1, further comprising a protective plate positioned between the light emitting element and the first surface for protecting the light-emitting element.

9. The apparatus of claim 1 wherein the light emitting element includes an LED array.

10. A scanner component, comprising:
    a reflective plate including at least one aperture formed at a central portion of the reflective plate;
    a light-emitting element proximate to the reflective plate;
    a scanning platform, wherein the light-emitting element is between the reflective plate and the scanning platform; and
    a spreading plate positioned between the light-emitting element and the scanning platform, wherein the spreading plate includes a first group of perforations that are less densely distributed than a second group of perforations.

11. The scanner component of claim 10 wherein the reflective plate is configured to be attached to an upper portion of a scanner.

12. The scanner component of claim 10 wherein the aperture does not reflect light produced by the light-emitting element.

13. The scanner component of claim 10 wherein the reflective plate includes a generally arced shape.

14. The scanner component of claim 10 wherein the aperture is a first aperture, and wherein the scanner component further comprises a second aperture formed in the reflective plate spaced apart from the first aperture.

15. An apparatus, comprising:
    a scanner upper portion having an upper surface opposite a lower surface;
    a light source within the scanner upper portion and configured to produce light;
    a reflective plate between the light source and the upper surface, wherein the reflective plate has at least one aperture formed therein and is configured to reflect at least a portion of the produced light from portions of the reflective plate not including the at least one aperture; and
    a spreading plate between the light source and the lower surface, wherein the spreading plate includes a plurality of perforations having a first group of perforations less densely distributed than a second group of perforations.

16. The apparatus of claim 15 wherein the spreading plate is configured to distribute at least a portion of the produced light.

17. The apparatus of claim 15 wherein the reflective plate has a generally arced shape.

18. The apparatus of claim 15 wherein the reflective plate is generally U-shaped.

19. The apparatus of claim 15 wherein the at least one aperture is a first aperture, and wherein the reflective plate further includes a second aperture spaced apart from the first aperture.

20. The apparatus of claim 15 wherein the at least one aperture includes a center portion and first and second end portions extending from the center portion,
    wherein the center portion is wider than one of the first and second end portions.

21. The apparatus of claim 15 wherein the spreading plate has a generally arced shape.

22. A scanner component, comprising:
    a reflective plate including a non-reflective central portion;
    a light-emitting element proximate to the reflective plate;
    a scanning platform proximate to the light-emitting element, wherein the light-emitting element is between the reflective plate and the scanning platform; and
    a light balancing member positioned between the light-emitting element and the scanning platform, wherein the light balancing member includes a first group of perforations that are less densely distributed than a second group of perforations.

23. The scanner component of claim 22 wherein the non-reflective central portion includes an aperture in the central portion of the reflective plate.

24. A scanner, comprising:
    a scanner upper portion having a first surface and a second surface;
    means for emitting light positioned within the scanner upper portion;
    means for reflecting light toward the second surface of the scanner upper portion, wherein the means for reflecting lights is positioned between the means for emitting light and the first surface of the scanner upper portion;
    means for distributing light toward the second surface of the scanner upper portion, wherein the means for distributing light is positioned between the means for emitting light and the second surface of the scanner upper portion, and wherein the means for distributing light includes a first group of perforations that are less densely distributed than a second group of perforations.

* * * * *